(12) United States Patent
Arai

(10) Patent No.: US 8,690,411 B2
(45) Date of Patent: Apr. 8, 2014

(54) BACKLIGHT DEVICE, LIGHT SOURCE DEVICE, LENS, ELECTRONIC APPARATUS AND LIGHT GUIDE PLATE

(75) Inventor: Takeo Arai, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/606,766

(22) Filed: Sep. 7, 2012

(65) Prior Publication Data

US 2013/0010494 A1    Jan. 10, 2013

Related U.S. Application Data

(62) Division of application No. 11/890,333, filed on Aug. 6, 2007, now Pat. No. 8,272,771.

(30) Foreign Application Priority Data

Aug. 9, 2006 (JP) .................................. 2006-216803

(51) Int. Cl.
*F21V 7/04* (2006.01)

(52) U.S. Cl.
USPC ............................ 362/609; 362/608; 362/612

(58) Field of Classification Search
USPC .......................................... 362/608–610, 612
See application file for complete search history.

(56) References Cited

U.S. PATENT DOCUMENTS

| | | | |
|---|---|---|---|
| 5,093,765 A | 3/1992 | Kashima et al. | |
| 5,477,422 A | 12/1995 | Hooker et al. | |
| 5,786,665 A | 7/1998 | Ohtsuki et al. | |
| 6,481,130 B1 | 11/2002 | Wu | |
| 6,566,689 B2 | 5/2003 | Hoelen et al. | |
| 6,700,634 B2 | 3/2004 | Taniguchi et al. | |
| 7,093,971 B2 | 8/2006 | Yu et al. | |
| 2002/0048163 A1* | 4/2002 | Kawakami et al. | 362/31 |
| 2003/0137615 A1 | 7/2003 | Nakayoshi et al. | |
| 2005/0007516 A1 | 1/2005 | Hong et al. | |
| 2006/0171165 A1* | 8/2006 | Tenmyo | 362/610 |
| 2008/0024696 A1 | 1/2008 | Arai | |
| 2008/0284942 A1 | 11/2008 | Mahama et al. | |
| 2008/0285268 A1 | 11/2008 | Oku et al. | |
| 2009/0207586 A1 | 8/2009 | Arai et al. | |

FOREIGN PATENT DOCUMENTS

| | | |
|---|---|---|
| EP | 1496488 A1 | 1/2005 |
| GB | 2.393.845 A | 4/2004 |
| JP | 3-208087 A | 9/1991 |
| JP | 6-301034 A | 10/1994 |
| JP | 09-145934 A | 6/1997 |
| JP | 63-10103 A | 1/1998 |
| JP | 11-212479 | 8/1999 |
| JP | 2001-222242 A | 8/2001 |

(Continued)

*Primary Examiner* — Sean Gramling
(74) *Attorney, Agent, or Firm* — Wolf, Greenfield & Sacks, P.C.

(57) ABSTRACT

Disclosed herein is a backlight device. The device includes: a light emitting element; a lens having an incident surface on which light emitted by the light emitting element is incident, and an outgoing surface which has an ability to converge the light and from which the light incident on the incident surface goes out; a light guide plate having a light incidence plane and introducing through the incidence plane the light going out from the outgoing surface, so as to perform surface light emission; and a reflective member operative to reflect a portion of the light going out from the outgoing surface of the lens, toward the incidence plane of the light guide plate.

8 Claims, 13 Drawing Sheets

(56) References Cited

FOREIGN PATENT DOCUMENTS

| | | |
|---|---|---|
| JP | 2002-109936 A | 4/2002 |
| JP | 2002-131743 A | 5/2002 |
| JP | 2004-6317 A | 1/2004 |
| JP | 2004-520695 A | 1/2004 |
| JP | 2004-191490 A | 7/2004 |
| JP | 2004-193049 A | 7/2004 |
| JP | 2004-287226 A | 10/2004 |
| JP | 2004-311353 A | 11/2004 |
| JP | 2005-044756 A | 2/2005 |
| JP | 2005-117023 A | 4/2005 |
| JP | 2005-148731 A | 6/2005 |
| JP | 2005-196989 | 7/2005 |
| JP | 2005-228623 A | 8/2005 |
| JP | 2005-327682 A | 11/2005 |
| KR | 2004-0064245 A | 7/2004 |
| WO | WO 02/090826 A1 | 11/2002 |
| WO | WO 2004/055429 A1 | 7/2004 |

* cited by examiner

FIG.7

| | C<br>CURVATURE AT VERTEX | nd<br>REFRACTIVE INDEX FOR d-LINE (WAVELENGTH: 587.56nm) | k<br>CONIC CONSTANT | $\alpha_2$<br>4TH DEGREE ASPHERIC COEFFICIENT | $\alpha_3$<br>6TH DEGREE ASPHERIC COEFFICIENT | $\alpha_4$<br>8TH DEGREE ASPHERIC COEFFICIENT |
|---|---|---|---|---|---|---|
| FIRST PRINCIPAL SURFACE | -1.25 | — | -1.0105050 | 0.0936758 | -0.0842475 | 0.0211605 |
| SECOND PRINCIPAL SURFACE | 0.39 | 1.51 | 4.4019329 | -0.3138933 | 0.3246447 | -0.1791684 |

FIG.11

| | C | nd | k | $\alpha_2$ | $\alpha_3$ | $\alpha_4$ |
|---|---|---|---|---|---|---|
| | CURVATURE AT VERTEX | REFRACTIVE INDEX FOR d-LINE (WAVELENGTH: 587.56nm) | CONIC CONSTANT | 4TH DEGREE ASPHERIC COEFFICIENT | 6TH DEGREE ASPHERIC COEFFICIENT | 8TH DEGREE ASPHERIC COEFFICIENT |
| FIRST PRINCIPAL SURFACE | -0.94 | — | -1.0239616 | -0.1280738 | 0.1015394 | -0.0377081 |
| SECOND PRINCIPAL SURFACE | 0.00 | 1.51 | 0.0000000 | 0.0000000 | 0.0000000 | 0.0000000 |

BACKLIGHT DEVICE, LIGHT SOURCE DEVICE, LENS, ELECTRONIC APPARATUS AND LIGHT GUIDE PLATE

CROSS REFERENCES TO RELATED APPLICATIONS

The present invention contains subject matter related to Japanese Patent Application JP 2006-216803, filed in the Japan Patent Office on Aug. 9, 2006, and is a divisional of U.S. patent application Ser. No. 11/890,333 filed in the U.S. Patent and Trademark Office on Aug. 6, 2007, the entire contents of which being incorporated herein by reference.

BACKGROUND OF THE INVENTION

1. Field of the Invention

The present invention relates to a backlight device for generating light in, for example, a display for displaying a picture according to luminance based on the transmittance of the light, a lens used in the backlight device, a light source device, an electronic apparatus, and a light guide plate.

2. Description of Related Art

In recent years, as a backlight mounted in a liquid crystal display, backlights using LEDs (Light Emitting Diodes) as light source have been proposed and embodied into products. In a high-color-gamut LED backlight, LEDs independent for R (red), G (green) and B (blue) colors are used, whereby it has become possible to achieve color reproduction with an NTSC (National Television System Committee) ratio of 100% or more. Displays having such a LED backlight are now expected to be commercialized in the forms of PC (Personal Computer), amusement gears, or in-vehicle use.

In the case of backlights of intermediate sizes ranging from about 7 to 17 inches, it is essential to reduce the thickness of the backlight. Here, in the so-called directly underlying type backlight, LEDs are arranged on the rear side of the display surface of a liquid crystal panel and along the display surface. Most of large-sized backlights include the directly underlying type backlight. However, in order to realize a thin type backlight as above-mentioned, it is indispensable to design a backlight of the so-called edge light type (side edge type) in which light is emitted from an edge of a light guide plate. As an example of the edge light type backlight, a technology of backlight with a contrivance for keeping the luminescent surface uniform has been disclosed in Japanese Patent Laid-open No. Hei 11-212479 (hereinafter referred to as Patent Document 1).

The invention pertaining to backlight in Patent Document 1 aims not at a reduction in thickness but at eliminating irregularities in luminance and contriving a reduced weight, even in a large-sized display (refer to, for example, paragraphs [0016], [0017], etc., FIGS. 1 and 3 of Patent Document 1). Specifically, as shown in FIG. 1 in Patent Document 1, four light sources (3) are provided so as to secure a predetermined luminance, and a clearance (11) is provided between light guide plates (9), (10) so as to contrive a reduced weight. In addition, as shown in FIG. 3 of Patent Document 1, cylindrical lenses (12) is disposed along both end parts of the clearance (11), whereby the light emitted from the light sources (3) is converged, and is uniformly dispersed in the area ranging from end parts to central parts of the light guide plates (9), (10). Incidentally, the light sources (3) are composed of hot cathode tubes or cold cathode tubes, as described in paragraph [0002] of the specification of Patent Document 1.

As a backlight using LEDs as light sources, a backlight reduced in luminance irregularities has been proposed (refer to, for example, Japanese Patent Laid-open No. 2005-196989 (hereinafter referred to as Patent Document 2)). In this backlight, the luminous intensity distributions of the RGB LEDs are controlled to within predetermined ranges, whereby irregularities in color and in luminance are reduced (refer to, for example, paragraph [0058], FIG. 3 of Patent Document 2).

SUMMARY OF THE INVENTION

In the case of a structure in which LEDs are disposed substantially in close contact with a light guide plate, as in the structure of the edge light type backlight disclosed in Patent Document 2, irregularities in chromaticity or luminance such as the so-called bulb shape appearing phenomenon are largely generated especially at an incidence part of the light guide plate even if the interval of the LEDs is small.

Thus, there is a need for a technology by which irregularities in luminance or chromaticity can be suppressed.

According to one embodiment of the present invention, there is provided a backlight device. The device includes: a light emitting element; a lens having an incident surface on which light emitted by the light emitting element is incident, and an outgoing surface which has an ability to converge the light and from which the light incident on the incident surface goes out; and a light guide plate having a light incidence plane and introducing through the incidence plane the light going out from the outgoing surface, so as to perform surface light emission. The device further includes a reflective member operative to reflect a portion of the light going out from the outgoing surface of the lens, toward the incidence plane of the light guide plate.

In the one embodiment of the present invention, the lens has the outgoing surface having a light converging ability, so that the light incident on the incident surface can be collected as much as possible, and the collected light can be made to go out toward the light guide plate. In addition, by the reflective member for reflecting the light going out from the outgoing surface of the lens toward the incidence plane of the light guide plate, the light going out from the outgoing surface and not going directly toward the light guide plate can also be introduced into the light guide plate. This makes it possible to increase the amount of the rays of light introduced into the light guide plate, to achieve uniform surface light emission, and to suppress irregularities in luminance. Besides, the luminance itself can be enhanced.

In the backlight device as above, preferably, the outgoing surface has a first principal surface (principal plane) having the converging ability, and a side surface provided at a side part of the first principal surface; and the backlight device further includes a reflective part provided so as to face the side surface and causing the light going out from the side surface to be again incident on the side surface and to go out through the first principal surface. The light going out from the side surface is light that would not be introduced into the light guide plate if the reflective part were absent. The presence of the reflective part ensures that the light going out from the side surface is further made to be incident on the lens and be utilized, whereby the amount of the rays of light introduced into the light guide plate is increased, and uniform light can be obtained. Besides, this makes it possible to enhance the light use efficiency and to enhance the luminance.

In the backlight device as above, preferably the outgoing surface has a first principal surface having the converging ability, and a side surface provided at a side part of the first principal surface; and the reflective member has a first reflective surface operative to reflect a portion of the light going out from the outgoing surface of the lens, toward the incidence plane of the light guide plate, and a second reflective surface provided so as to face the side surface and reflecting the light going out from the side surface to cause the light to be again incident on the side surface and go out through the first principal surface. The light going out from the side surface is light that would not be introduced into the light guide plate if the second reflective surface were absent. The presence of the second reflective surface ensures that the light going out from the side surface is further made to be incident on the lens and be utilized, whereby the amount of the rays of light introduced into the light guide plate is increased, and uniform light can be obtained. In addition, since the single reflective member has both the functions of the first and second reflective surfaces, a reduction in the size or thickness of the backlight device can be realized.

In the backlight device as above, preferably, the reflective member includes a base part having the second reflective surface, and a wedge part having the first reflective surface and having a width which gradually decreases in the thickness direction of the light guide plate as one goes from the base part toward the light guide plate. The reflective member is used also as a member for positioning the lens. There is no need to separately provide a lens-fixing member or the like, so that a reduction in the size or thickness of the backlight device can be realized, and the backlight device is simplified in structure.

In the backlight device as above, preferably, the incident surface includes a second principal surface having a converging ability, and a projected surface provided at an end part of the second principal surface and projected from the second principal surface. This ensures that, for example, even when light diffused widely from the light emitting element to the surroundings is generated, the light can be efficiently collected through the projected surface into the lens. The converging ability of the first principal surface and the converging ability of the second principal surface may be different or the same.

In the backlight device as above, preferably, the incident surface has an ability to diverge the light. This ensures that, even when the light is diverged at the incident surface, the light can be converged by the first principal surface, and the light going out from the side surface can be reflected by the reflective part and the second reflective surface, so that light use efficiency can be enhanced.

In the backlight device as above, preferably, the lens is a lens having a cylindrical surface as the outgoing surface or the first principal surface or a lens having a toroidal surface as the outgoing surface. The same applies also to the second principal surface.

In the backlight device as above, preferably, the lens has a reflective surface provided at a side part of the outgoing surface and reflecting the light which is incident on the incident surface and which passes through the lens. While the light is reflected by the reflective part or the second reflective surface in the above-mentioned configurations, the lens in this configuration has the reflective surface including the reflecting function.

In the backlight device as above, preferably, the light emitting element is an element emitting the light in a plurality of colors. The lens is so configured that as much as possible of the rays of light emitted from the light emitting element at various angles can be taken in. Therefore, mixing of rays of light in a plurality of colors is promoted, and mixed color light free of irregularities in chromaticity or luminance can be produced at the incidence plane of the light guide plate.

In the backlight device as above, preferably, the light guide plate has a lens part or prism part provided at the incidence plane. Depending on the shape of the outgoing surface of the lens, the dispersion of light in the plane of the light guide plate may be comparatively small or may be comparatively large. In this configuration, the magnitude of the dispersion of light can be controlled appropriately.

According to another embodiment of the present invention, there is provided a backlight device. The device includes: a light emitting element; and a lens having an incident surface on which light emitted by the light emitting element is incident, an outgoing surface which has an ability to converge the light and from which the light incident on the incident surface goes out, and a side surface provided at a side part of the outgoing surface. The device further includes a light guide plate having a light incidence plane and introducing through the incidence plane the light going out from the outgoing surface, so as to perform surface light emission; and a reflective part provided so as to face the side surface and causing the light going out from the side surface to be again incident on the side surface and go out through the outgoing surface.

According to this configuration, the light going out from the side surface of the lens is reflected by the reflective part, to be again introduced through the side surface into the lens, whereby the amount of rays of light introduced into the light guide plate is increased, uniform surface light emission can be obtained, and irregularities in luminance can be suppressed. In addition, light use efficiency is enhanced, and luminance itself can be enhanced.

Thus, according to the technologies of backlight and the like based on the present invention, irregularities in luminance or chromaticity can be suppressed. Besides, a reduction in cost and a simplified structure can be realized.

BRIEF DESCRIPTION OF THE DRAWINGS

FIG. 7 is a table showing design values specifying the shapes of first and second principal surfaces of a lens;

FIG. 11 is a table showing design values specifying the shapes of a principal surface and an incident surface of a lens;

DETAILED DESCRIPTION OF THE PREFERRED EMBODIMENTS

Figure 1:
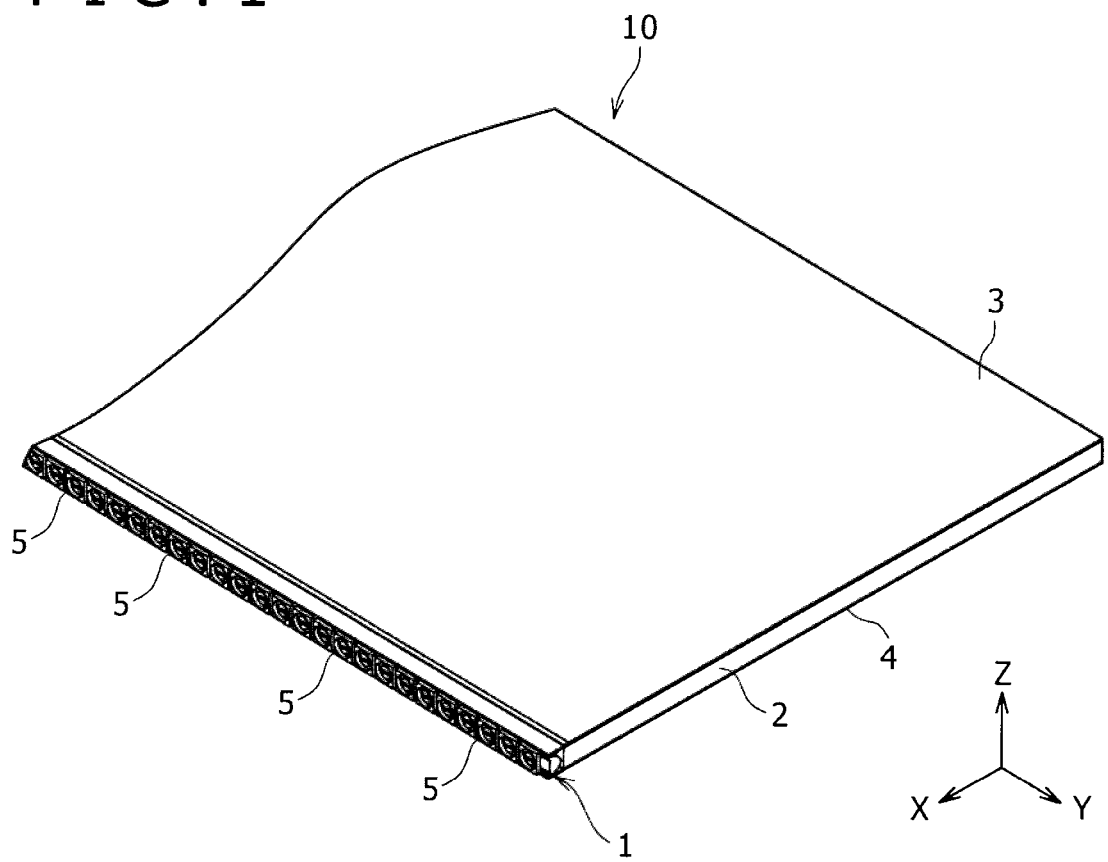
FIG. 1 is a perspective view showing a backlight device according to an embodiment of the present invention.

Now, an embodiment of the present invention will be described below, referring to the drawings.

FIG. 1 is a perspective view showing a backlight device according to an embodiment of the present invention.

Figure 2:
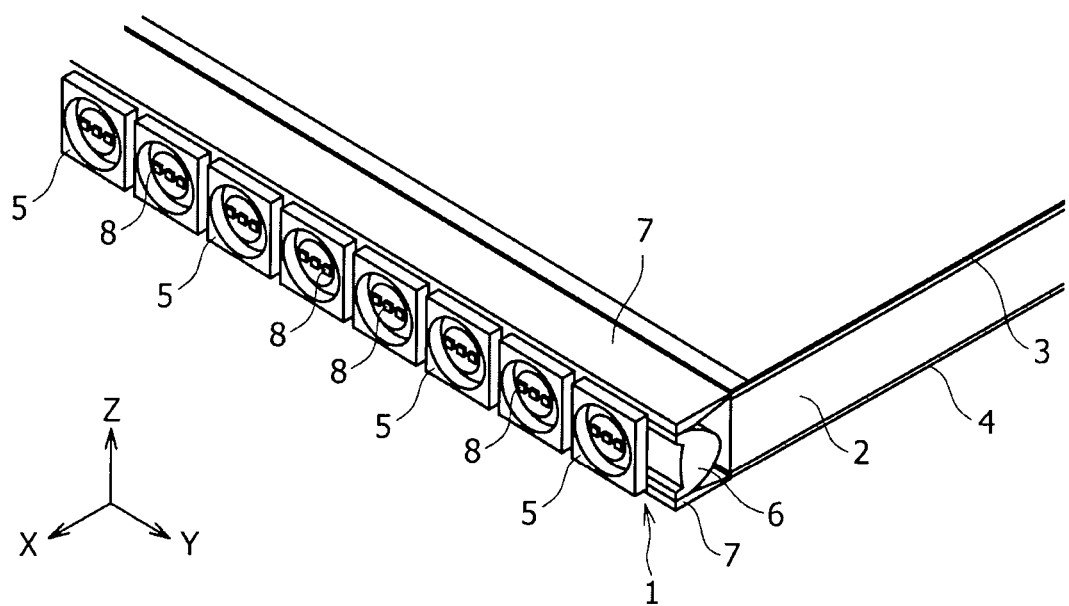
FIG. 2 is a perspective view showing in an enlarged form a part of the backlight device shown in FIG. 1.
Figure 3:
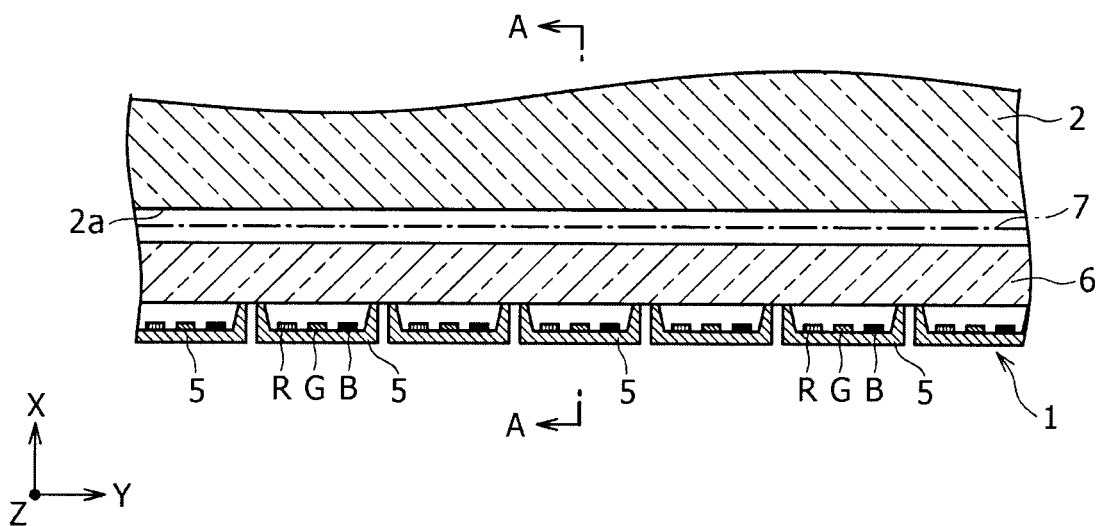
FIG. 3 is a sectional view, taken along a horizontal plane, of a part of the backlight device.
Figure 4:
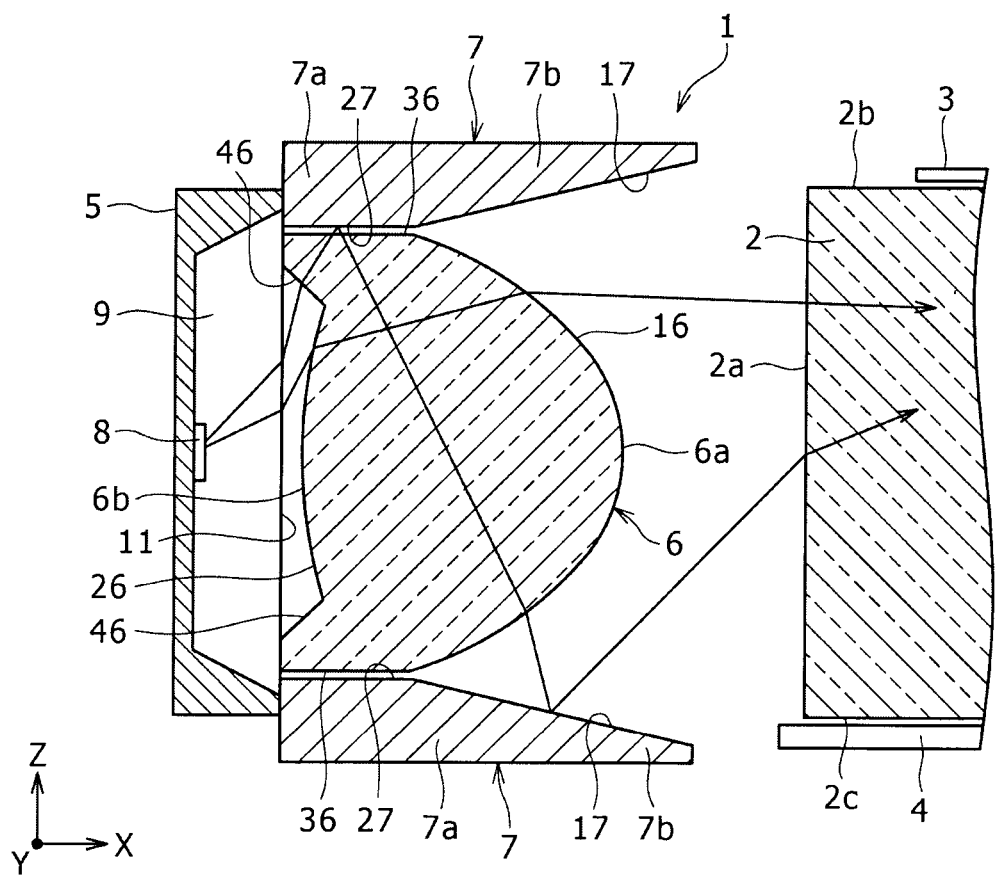
FIG. 4 is a sectional view taken along line A-A of FIG. 3.

FIG. 2 is a perspective view showing in an enlarged form a part of the backlight device 10 shown in FIG. 1. FIG. 3 is a plan view showing a part of the backlight device 10. The backlight device 10 is a device which is disposed mainly on the back side of a liquid crystal panel (not shown) having, for example, liquid crystal elements as elements for modulating the transmittance of light. The backlight device 10 includes a light source device 1, a light guide plate 2, and optical sheets 3, 4. FIG. 3 is a sectional view, taken along a horizontal plane, of a part of the backlight device 10, and FIG. 4 is a sectional view taken alone line A-A of FIG. 3.

Figure 5:
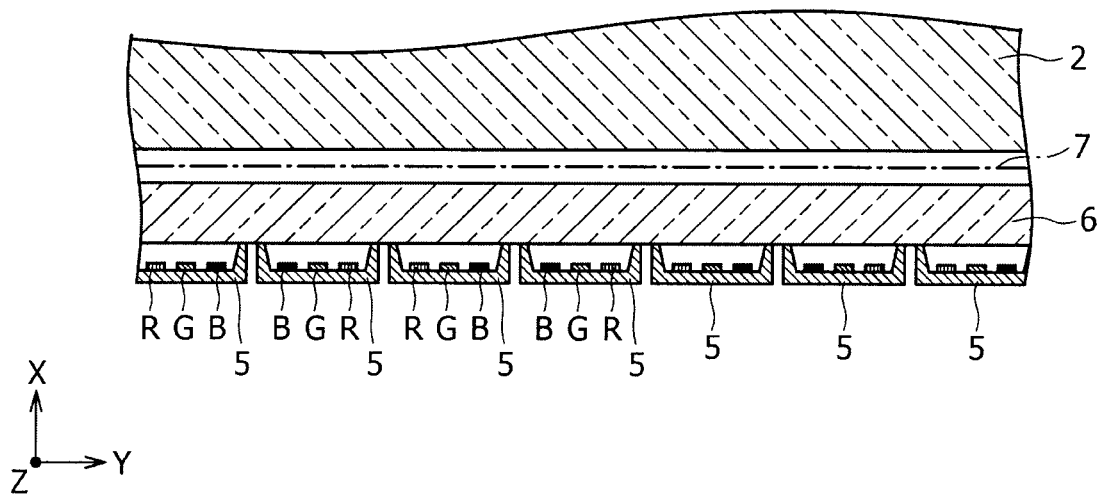
FIG. 5 shows a modification example of the order in which LEDs for RGB colors are aligned in a light source block.

As shown in FIG. 1, the light source device 1 has, for example, a plurality of light source blocks 5, a lens 6 for leading the light generated by the light source blocks 5 to the light guide plate 2, and a reflective member 7 reflecting the light led from the lens 6. The light source block 5 includes, for example, LEDs 8 as light emitting elements. As shown in FIG. 4, in the light source block 5 in this embodiment, LED chips for three primary colors of red (R), green (G) and blue (B) are mounted, and the LEDs 8 are potted with a transparent resin 9. It is ideal for the transparent resin 9 to have a light transmittance of 100%, but, naturally, some absorption of light occurs in the transparent resin 9 although it is "transparent". As shown in FIG. 3, the light source blocks 5 are aligned in one row along an incidence plane 2a of the light guide plate 2 so that, in each of the light source blocks 5, the LEDs 8 are aligned in the color order of R, G and B from the left side in the figure. However, as shown in FIG. 5, the light source blocks 5 may be alternately reversely arranged in the arranging direction (Y direction) so that the LEDs 8 are arranged in the color orders of RGB, BGR, RGB, . . . . Or, the light source blocks 5 may be arranged so that the color orders are directed at random.

The form of the light source block 5 is not limited to the above-mentioned. For example, an LED for one color may be mounted in each light source block, or LEDs for two colors may be mounted in each light source block. Or, one light source block may include LEDs for four or more different colors or for substantially the same color. The colors of the LEDs are not limited to the three colors of R, G and B; for example, adoption of various colors such as yellow, orange and emerald may be contemplated. In other words, the color produced by the backlight device 10 (the color in which the light guide plate 2 performs surface light emission) is not limited to white but may be any of the above-mentioned colors used singly (monochromic) or in combination thereof. Or, a light source block including white-color LEDs may be used as the light source block. In the case where each light source block includes LEDs for one color, light source blocks respectively for R, G and B colors may be arranged in an order, or they may be arranged so that the R, G and B colors may be arranged at random. The number of the light source block(s) is not limited, and the number may be one or more. Where the number of the light source block(s) is one or a small number, power LEDs are desirably used. The number of the light source block(s) depends also on the size of the liquid crystal panel.

The light guide plate 2 and the optical sheets 3, 4 may be any of various known ones. Examples of the optical sheet 3 disposed on the side of the front surface 2b of the light guide plate 2 (on the side on which the liquid crystal panel is disposed) include a prism sheet and a diffuser sheet. Examples of the optical sheet 4 disposed on the side of the rear surface 2c of the light guide plate 2 include a reflective sheet. In addition, a polarizing sheet may be included in the optical sheets 3, 4. The prism sheet may be a normal prism sheet or a reverse prism sheet. However, the configurations and layout of the optical sheets are not limited to the above-mentioned configurations and layout, and various known ones may be used, as above-mentioned.

The lens 6 is disposed oppositely to the incidence plane 2a of the light guide plate 2 so that it extends along the incidence plane 2a, and is elongate in shape (see FIG. 3). The lens 6 is clamped between two reflective members 7 in the thickness direction of the light guide plate 2 (Z direction), for example. The reflective member 7 is formed to be elongate in the Y direction, and may be split in the Y direction into two or more parts. The lens 6 also may be a single elongate one or may be split in the Y direction into two or more parts, like the reflective member 7.

As shown in FIG. 4, the reflective member 7 has a base part 7a and a wedge part 7b, and the light source blocks 5 and the lens 6 are in contact with the base part 7a. The wedge part 7b has a tapered shape such that the thickness thereof gradually decreases as one goes away from the base part 7a. The wedge part 7b has a first reflective surface 17 for reflecting a portion of the light going out from the outgoing surface 6a of the lens 6 toward the light guide plate 2. The angle (for example, the angle against the optical axis, i.e., the X axis) of the first reflective surface 17 can be appropriately set. On the other hand, the base part 7a has a second reflective surface 27 which faces a side surface 36 of the lens 6 and which reflects the light going out from the side surface 36 and causes the light to be again incident on the side surface 36. The light thus again incident on the side surface 36 goes out through the outgoing surface 6a of the lens 6 to be incident on the incidence plane 2a of the light guide plate 2, as will be described later. The first reflective surface 17 or the second reflective surface 27 is realized by forming a film with a high light reflectance by, for example, vapor deposition, sputtering, coating or the like method. Or, alternatively, the material itself of the reflective member 7 may be a material having such a high reflectance.

The light source device 1 and the light guide plate 2 and the like are fixed by being positioned by appropriate members such as frames (not shown). The light source blocks 5, the lens 6 and the reflective members 7 may be relatively positioned and fixed by use of adhesive materials or the like fixing method, or they may not necessarily be in direct contact with each other but may be fixed by appropriate fixing methods.

As shown in FIG. 4, the lens 6 has the incident surface 6b on which the light emitted from the light source blocks 5 is incident, and the outgoing surface 6a through which the light goes out. The outgoing surface 6a has a first principal surface 16 which has an ability to converge the light, i.e., which is convex, and the side surfaces 36 provided at side parts of the first principal surface 16. As has been mentioned above, the side surface 36 of the lens 6 faces, and makes contact with, the second reflective surface 27 of the base part 7a of the reflective member 7. The incident surface 6b has a second principal surface 26 having an ability to converge the light, and projected surfaces 46 provided at upper and lower end parts of the second principal surface 26 and projected from the second principal surface 26. The projected surfaces 46 are each so provided as to form an optimum angle with a package surface 11 of the light source blocks 5. The optimum angle is, for example, such an angle as to ensure that as much as possible of the light coming from the light source blocks 5 can be made incident on the lens 6.

The first principal surface 16 is, for example, a toroidal surface or a cylindrical surface. The second principal surface 26, also, is a toroidal surface or a cylindrical surface. The combination of the first and second principal surfaces 16 and 26 may be the first principal surface 16 being a toroidal surface with the second principal surface 26 being a cylindrical surface, or may be the first principal surface 16 being a cylindrical surface with the second principal surface 26 being a toroidal surface. Or, both the principal surfaces 16 and 26 may be toroidal surfaces, or may be cylindrical surfaces. The side surfaces 36 are not limited to flat surfaces but may be curved surfaces. Like the side surfaces 36, the projected surfaces 46 may be curved surfaces.

Non-limitative examples of the material of the lens 6 include polycarbonates, olefin resins, and glass materials. Each of these materials ensures heat resistance.

Figure 6:
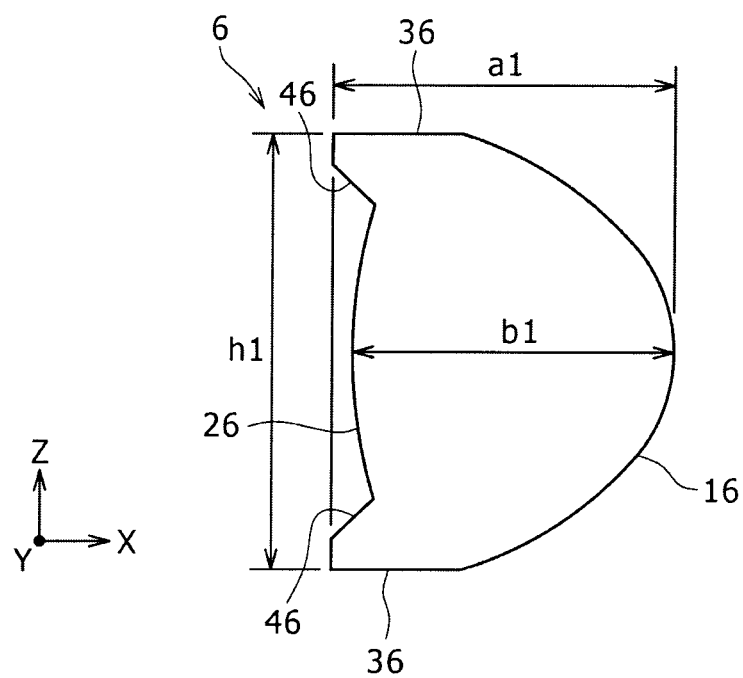
FIG. 6 shows design values of a lens.

FIG. 6 shows design values of the lens 6. As shown in FIG. 6, the height h1 of the lens 6, the thickness a1 of the lens 6, and the thickness b1 of the lens 6 on the optical axis are, for example, so set that h1=2.94 mm, a1=2.23 mm, and b1=2.10 mm. The length of the lens 6 in the longitudinal direction, i.e., the direction orthogonal to the paper surface, namely, the Y direction in FIG. 5, is 43.34 mm. The LED chip in the light source block 5 is about 0.3 mm square. These values are given merely as examples, and they can be appropriately modified.

FIG. 7 is a table showing design values specifying the shapes of the first and second principal surfaces 16 and 26 of the lens 6. In this example, both of the first and second principal surfaces 16 and 26 are aspheric surfaces (non-cylindrical surfaces), for example, toroidal surfaces. In a rectangular coordinate system with the vertex of each of the principal surfaces 16 and 26 as an origin and with the optical axis direction as X axis, let the curvature at the vertex of each principal surface be c, the conic constant be k, and the 4th, 6th and 8th degree aspheric coefficients be α2, α3 and α4, then the aspheric surface deformation amount ΔH(h), i.e., the aspheric surface, can be expressed by the following formula (I). In consideration of this rectangular coordinate system, the height direction in the Z direction in the figure from the optical axis is taken as y axis.

$$\Delta H(h) = (cy^2/[1+\{1-(1+k)c^2y^2\}^{1/2}]) + \alpha_2 y^4 + \alpha_3 y^6 + \alpha_4 y^8 \quad (1)$$

Now, referring to FIG. 4, the operation of the backlight device 10 will be described.

Of the rays of light generated from each LED 8, those within a predetermined angular range are transmitted through the transparent resin 9, due to the influences of critical angles with respect to the package surface 11 and the second principal surface 26. As viewed in the X-Y plane with the X axis direction taken as an angle of 0 degree, the rays of light transmitted through the transparent resin 9 are basically dispersed substantially to 90 degrees. The lens 6 in this embodiment can lead also the rays of light with such a dispersion, to the light guide plate 2.

Of the rays of light transmitted through the transparent resin 9, those rays at comparatively small angles to the optical axis of the lens 6 (the X axis direction) are incident on the second principal surface 26. The rays of light incident on the second principal surface 26 are refracted, pass through the lens 6, go out through the first principal surface 16, and are introduced into the incidence plane 2a of the light guide plate 2. On the other hand, of the rays of light transmitted through the transparent resin 9, those rays at comparatively large angles to the optical axis are incident on the projected surfaces 46. The rays of light incident on the projected surfaces 46 are refracted, go out through the side surfaces 36 of the lens 6, are then reflected by the second reflective surfaces 27 of the reflective members 7, and are again incident on the side surfaces 36 of the lens 6. The rays of light incident on the side surface 36 go out through the first principal surface 16, are then reflected by the first reflective surfaces 17 of the reflective members 7, and are introduced into the incidence plane 2a of the light guide plate 2a.

Figure 8:
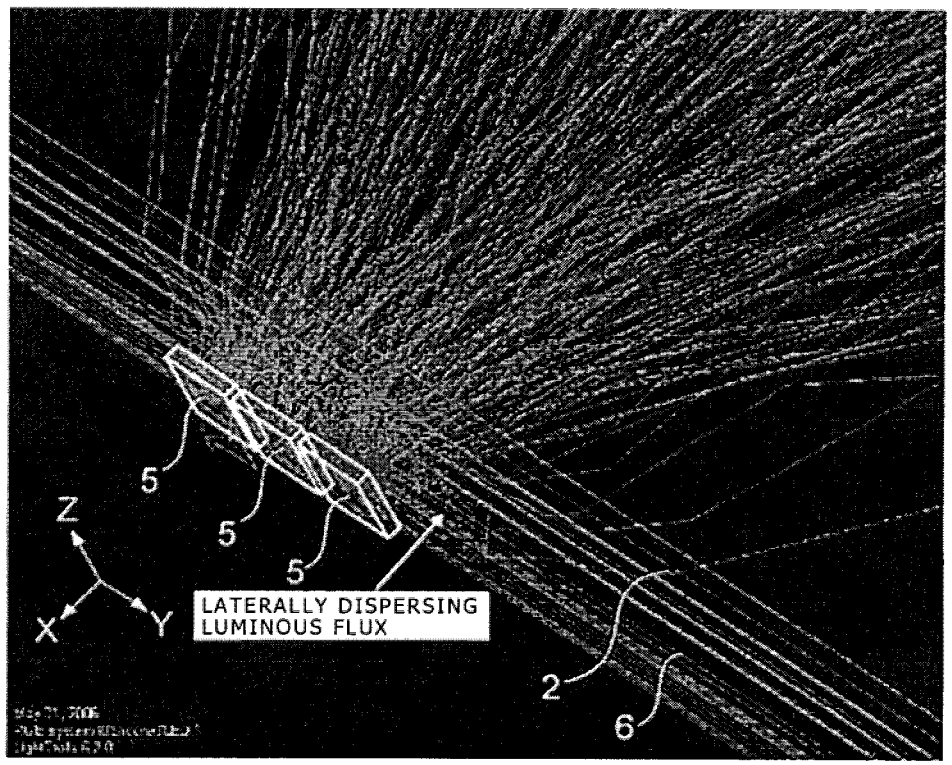
FIG. 8 shows the manner in which rays of light generated from three light source blocks, for example, are propagated through a lens and a light guide plate.
Figure 9:
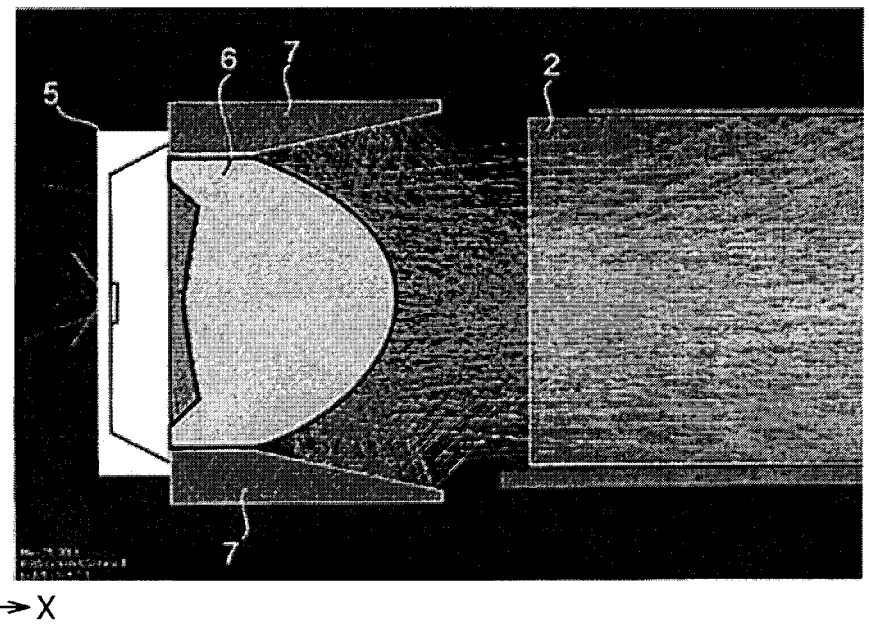
FIG. 9 shows the manner in which the rays of light in FIG. 8 are transmitted, as viewed in an X-Z plane.

FIG. 8 shows the manner in which the rays of light emitted from the three light source blocks 5, for example, are propagated through the lens 6 and the light guide plate 2. FIG. 9 shows the same, as viewed in the X-Z plane. It is seen from FIG. 8 that the rays of light are dispersed in the lens 6 in also the Y direction, i.e., in the longitudinal direction of the lens 6. Thus, propagation of light in the lens 6 occurs not only in the optical axis direction but also crosswise direction and skew directions, attended by multiple reflection occurring repeatedly, whereby mixing of RGB colors of light emitted by the light source blocks 5 is promoted, and a desired white color can be produced. Of the light propagated through the lens 6 while undergoing multiple reflection repeatedly, about 65% is led to the light guide plate 2.

Thus, according to the light source device 1 in this embodiment, the lens 6 has the first principal surface 16 having a converging ability, so that it is possible to collect as much as possible the light incident on the incident surface 6b and to cause the collected light to go out toward the light guide plate 2. In addition, the rays of light going out from the first principal surface 16 and not going directly to the light guide plate 2 can also be introduced into the light guide plate 2, by the first reflective surfaces 17 of the reflective members 7. This ensures that the amount of the rays of light introduced into the light guide plate 2 can be increased, a uniform surface light emission can be obtained, and irregularities in luminance can be suppressed. Besides, the luminance itself can be enhanced.

According to the lens 6 in this embodiment, the mixing of the RGB colors of light emitted by the light source blocks 5 is promoted as above-mentioned, so that a white color free of irregularities in chromaticity or in luminance can be produced at the incidence plane 2a of the light guide plate 2.

The rays of light going out from the side surfaces 36 of the lens 6 would not be introduced into the light guide plate 2 if the second reflective surfaces 27 of the reflective members 7 were absent. But, actually, the second reflective surfaces 27 are present, whereby the rays of light going out from the side surfaces 36 are made to be again incident on the lens 6 and be utilized; as a result, the amount of the rays of light introduced into the light guide plate 2 is increased, whereby uniform light can be obtained. Besides, this leads to further promotion of mixing of colors, whereby the above-mentioned effect is realized.

Furthermore, since each of the reflective members 7 has both the functions of the first and second reflective surfaces 17 and 27, a reduction in the size or thickness of the backlight device 10 can be realized. In addition, the reflective member 7 has also the function as a member for positioning the light source blocks 5 and the lens 6. Therefore, it is unnecessary to separately prepare a member or members for fixing the light source blocks 5 and the lens 6, which also makes it possible to realize a reduction in the size or thickness of the backlight device 10.

According to the lens 6 in this embodiment, since the projected surfaces 46 are provided, even when rays of light dispersed widely from the light source blocks 5 to the surroundings are generated, the rays of light can be efficiently collected into the lens 6 through the projected surfaces 46.

Meanwhile, in general, the number of LED chips mounted varies depending on whether a power-type LED is used or an ordinary LED is used, as the LED for constituting the backlight, in consideration of the quantity of light emitted. The power-type LED is driven, for example, by about 10 times the current value (about several hundreds of milliamperes) for the ordinary LED. In the case of using the power-type LED, it is difficult to put the RGB chips adjacent to each other, taking into account the number of LEDs mounted and the measure for coping with heat. Therefore, the chip interval becomes large, which is disadvantageous in obtaining white light by mixing the RGB rays of light in a limited space. In the case of using the power-type LED, few problems are generated if a sufficient optical path can be secured, but it is very difficult to obtain a sufficient optical path, due to the problem as to the space for the frame of the backlight and due to limitations in thickness attendant on a reduction in thickness of the system. In view of this, in some cases of the related-art backlight, conversion to white light is carried out positively by utilizing a dichroic mirror; even in these cases, however, the size of the optical system yet causes some problems as to reductions in thickness and frame width.

On the other hand, utilization of the ordinary low-power LED makes it possible to realize an extremely small intervals between the RGB LED chips, which is advantageous in realizing reductions in thickness and frame (architrave) width. However, as has been mentioned above, in the case of a structure in which LEDs are disposed substantially in close contact with a light guide plate, as in the edge light type backlight structure described in Patent Document 2, irregularities in luminance and/or chromaticity would be generated even if the chip interval is small.

Besides, in the case of the ordinary LED, utilization of the dichroic mirror is attended by the need to make the mirror itself thinner, which brings about a problem on a strength basis. In addition, since the optical component parts are minute in size, a large rise in cost would result from a rise in the cost of forming the reflective film and the like. In the case of utilizing a dichroic mirror, a lens is inserted immediately behind the LEDs so that the rays of light from the light source are once made parallel, and this configuration also is attended by limitation to realizing a lower aperture ratio. The light source device 1 in this embodiment can solve these problems, and its simple structure enables a reduction in cost and a reduction in size or thickness. In addition, the realization of the simple structure makes it possible to reduce the width w (shown, for example, in FIG. 17) of the frame (architrave) supporting the light source device 1.

Figure 10:
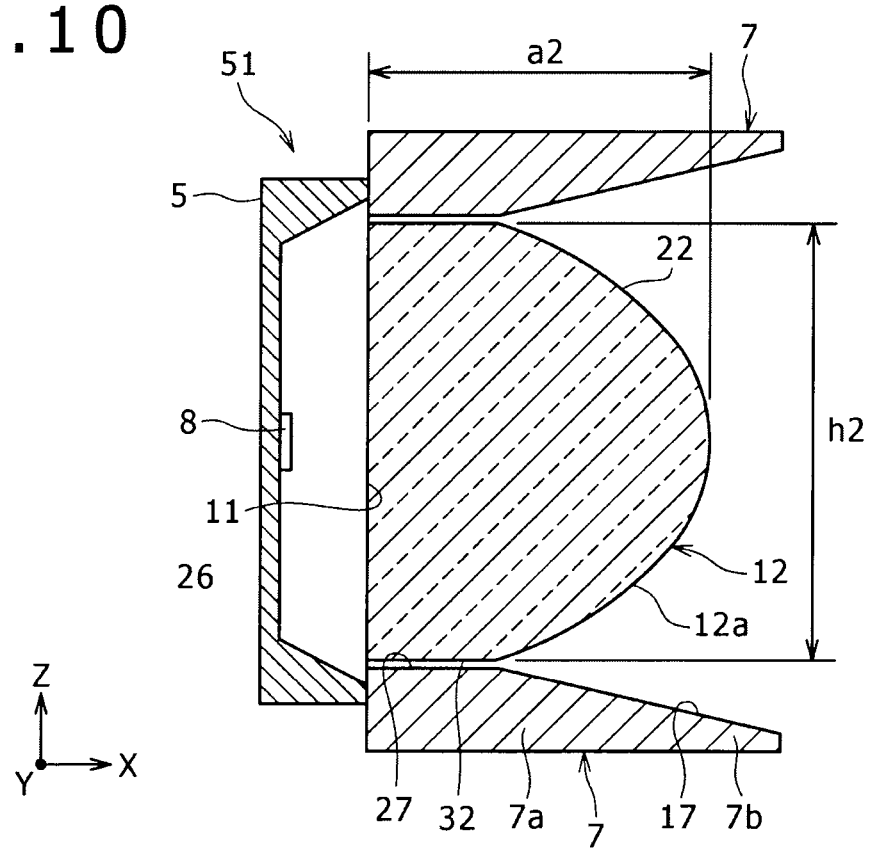
FIG. 10 is a sectional view showing a light source device according to another example of the present invention.

FIG. 10 is a sectional view showing a light source device according to another embodiment of the present invention. Hereinafter, for the same members and functions or the like as those of the backlight device 10 according to the embodiment shown in FIGS. 1 to 4 and the like, the descriptions will be simplified or omitted, and the following description will be centered on the differences from the above-described embodiment.

In a light source device 51 shown in FIG. 10, the shape of the lens 12 is different from that of the lens 6 in the light source device 1 shown in FIG. 4. Like the lens 6, the lens 12 faces the incidence plane 2a of the light guide plate 2, and is elongate in the Y axis direction along the incidence plane 2a. The lens 12 includes an incident surface 12b, and an outgoing surface 12a having a principal surface 22 and side surfaces 32 provided at side parts of the principal surface 22. The height h2 of the lens 12 and the thickness a2 of the lens 12 on the optical axis are set to be h2=2.94 mm and a2=2.23 mm. The length in the longitudinal direction, or the Y direction, of the lens 12 is 43.34 mm. These values may be modified appropriately.

FIG. 11 is a table showing design values for specifying the shapes of the principal surface 22 and the incident surface 12b of the lens 12. The shape of the principal surface 22 is specified by the above formula (I); in this example, the principal surface 22 is a toroidal surface, and the incident surface 12b is a flat (plain) surface. The lens 12 is positioned relative to light source blocks 5 and reflective members 7 so that side surfaces 32 constituting parts of the outgoing surface 12a of the lens 12 face second reflective surfaces 27 of the reflective members 7 and that the incident surface 12b of the lens 12 faces a package surface 11 for the light source blocks 5.

With this configuration of the light source device 51, also, it is possible to efficiently collect the rays of light emitted from the light source blocks 5 and to suppress the irregularities in chromaticity and luminance in the light guide plate 2.

Figure 12:
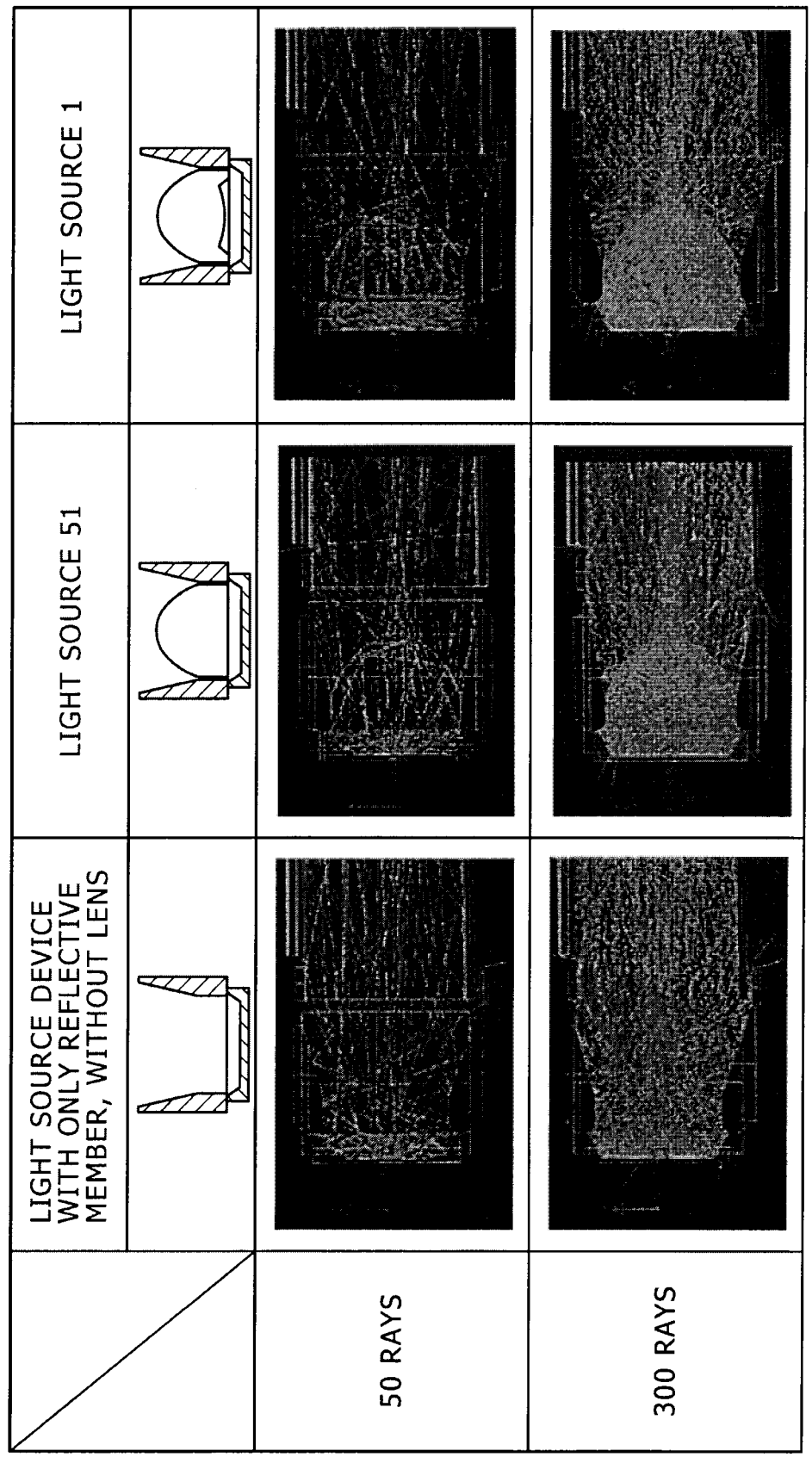
FIG. 12 shows the conditions of rays of light when three kinds of light source devices are operated to emit light.

FIG. 12 shows the conditions of rays of light emitted from three kinds of light source devices. The cases of a light source device with reflective members 7 and without any lens, the light source device 51 shown in FIG. 10, and the light source device 1 shown in FIG. 4 are shown, in this order from the left side in FIG. 12. The upper diagrams correspond to the cases of 50 rays of light, while the lower diagrams correspond to the cases of 300 rays of light. Particularly in the light source device 51 and the light source device 1, the numbers of the rays of light in the lenses 12 and 6 are large, which indicates that mixing of colors is promoted.

Figure 13:
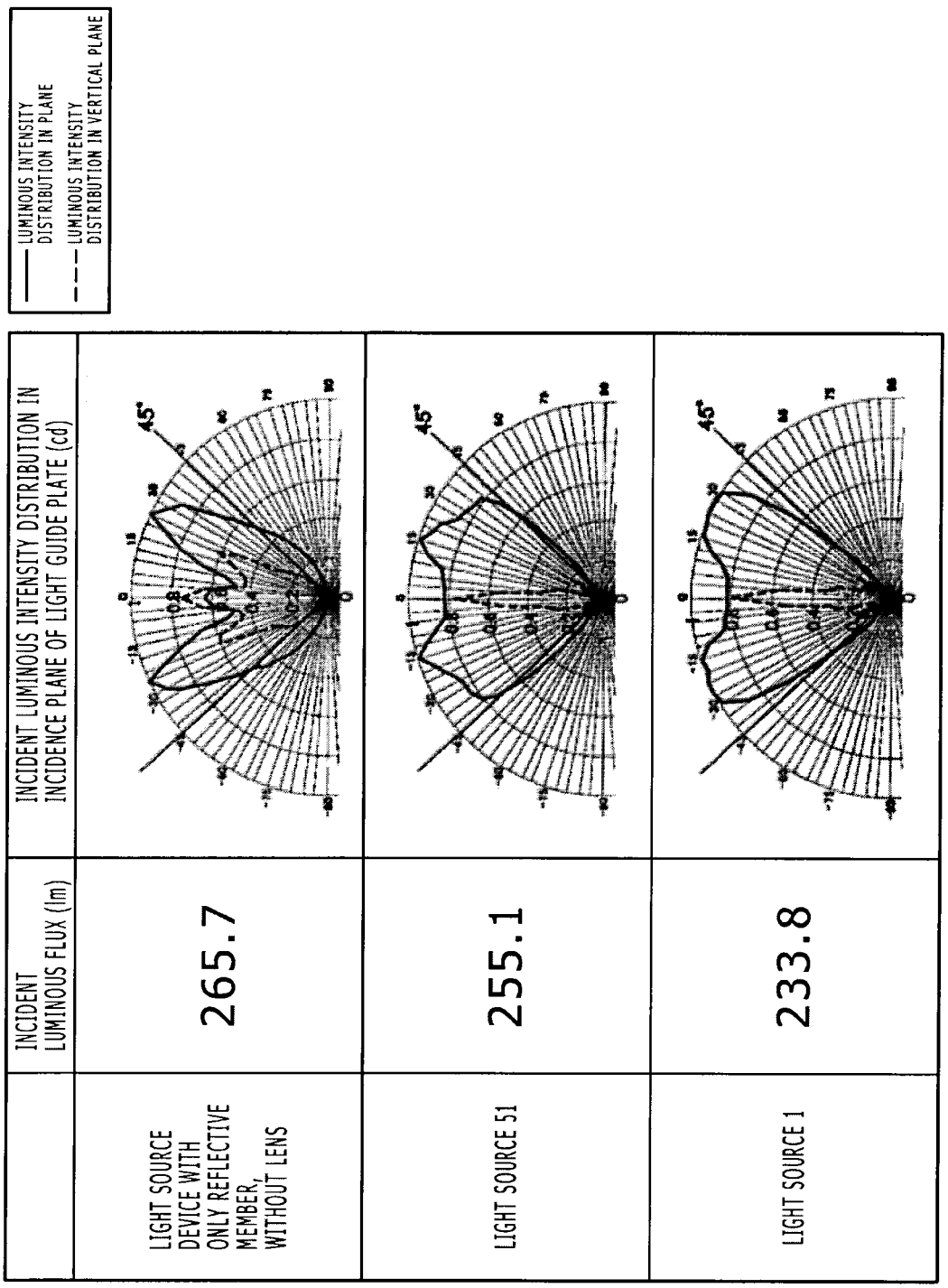
FIG. 13 shows diagrams representing the luminous intensity distribution characteristics in the vicinity of incidence planes of light guide plates, in the three kinds of light source devices.

FIG. 13 shows the luminous intensity distribution characteristics in the vicinity of the incidence plane 2a of the light guide plate 2, in each of the above-mentioned three kinds of light source devices. The cases of the light source with only the reflective members and without any lens, the light source device 51 shown in FIG. 10, and the light source device 1 shown in FIG. 4 are shown, in this order from the upper side in FIG. 13. The incident luminous fluxes (unit: lumen (lm)) are 265.7, 255.1, and 233.8, respectively. In the graphs of the luminous intensity distribution characteristics, the solid line shows the condition as viewed in the X-Y plane in FIG. 4 or 10 (hereinafter referred to as "luminous intensity distribution in plane"). In this case, the radial direction of the circle represents the luminous intensity (quantity of light) (unit: candela (cd)), the vertical direction (angle: 0 degree) from the center of the circle is the optical axis direction (X axis direction), and the left-right direction (±90 degrees) is the longitudinal direction (Y axis direction) of the lens. Besides, the broken line shows the condition as viewed in the X-Z plane in FIG. 4 or 10 (hereinafter referred to as "luminous intensity distribution in vertical plane"). In this case, the direction of angle of 0 degree is the optical axis direction (X axis direction), and the direction of ±90 degrees is the vertical direction (Z axis direction).

In the light source device without any lens, the absence of lens ensures that the quantity of light introduced into the light guide plate 2 is large, and the light use efficiency is high. As for the luminous intensity distribution in plane, however, in the angular range of from −45 degrees to +45 degrees, strong peaks remain in the vicinity of ±27 degrees. Besides, in the luminous intensity distribution in plane, the light is largely split into the left and right parts, due to the layout of the RGB LEDs 8 in the light source block 5. For example, the light on the minus side is due mainly to the green LED, and the light on the plus side is due mainly to the blue LED. In addition, the light in the vicinity of 0 degree is due mainly to the red LED. As for the luminous intensity distribution in vertical plane, also, an angular dispersion exists. As the angle of the luminous intensity distribution in vertical plane is smaller, it is more favorable, and the light is led more nearly perpendicularly to the incidence plane 2a of the light guide plate 2. Thus, in the light source device without any lens, irregularities in chromaticity and luminance are generated at the incidence plane 2a of the light guide plate 2.

In the light source device 51, the quantity of light is reduced by about 4%, as compared with that in the light source device without any lens. However, the effect on mixing of RGB colors is favorable. As for the luminous intensity distribution in plane, the distribution is favorable though there are some minute peaks in the angular range of from −45 degrees to +45 degrees. As for the luminous intensity distribution in section, also, the distribution is favorable with a small angle of dispersion.

In the light source device 1, the quantity of light is reduced by about 12%, as compared with that in the light source device without any lens. However, the effect on mixing of RGB colors is the highest. As for the luminous intensity distribution in plane, there is no steep peak in the angular range of from −45 degrees to +45 degrees. As for the luminous intensity distribution in section, also, the distribution is favorable with a small angle of dispersion.

Figure 14:
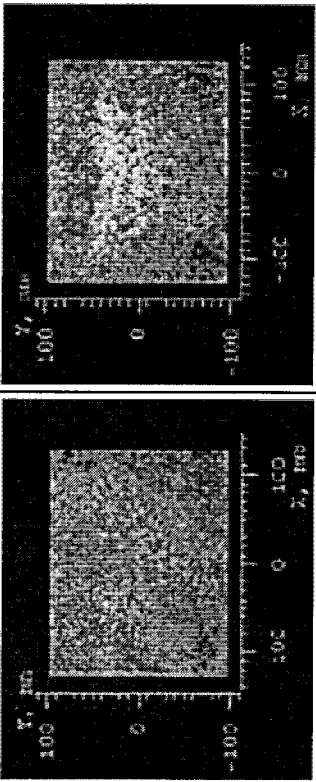
FIG. 14 shows the conditions of luminance and chromaticity in the light guide plates, in the three kinds of light source devices.
Figure 15A:
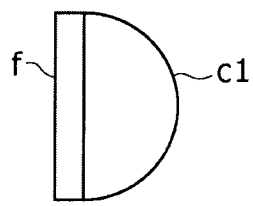
FIGS. 15A to 15H show various modification examples of the lens.
Figure 15B:
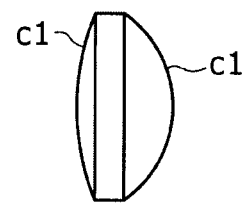
Figure 15E:
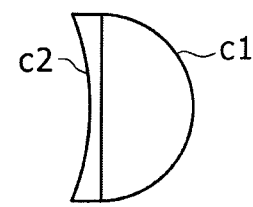
Figure 15C:
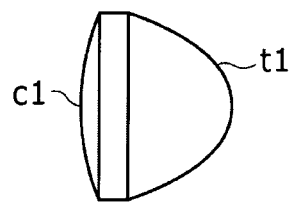
Figure 15F:
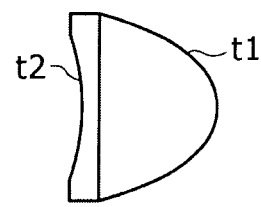
Figure 15D:
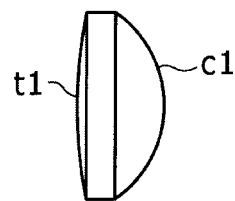
Figure 15G:
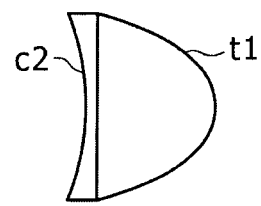
Figure 15G:
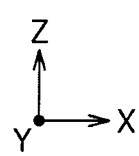
Figure 15H:
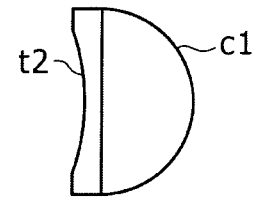

FIG. 14 shows the conditions of luminance distribution and chromaticity distribution in the light guide plate 2, in each of the above-mentioned three kinds of light source devices. The cases of the light source device with only reflective members and without any lens, the light source device 51 shown in FIG. 10, and the light source device 1 shown in FIG. 4 are shown, in this order from the left side in FIG. 14. As for luminance in the light guide plate 2 in the light source device without any lens, the portion where the color is lighter on the upper side (the vicinity of the incidence plane 2a in the light guide plate 2) indicates condensation of light, showing the generation of irregularities in luminance. In this point, luminance irregularities are suppressed in the light source device 51 and the light source device 1.

On the other hand, as for the chromaticity diagram, for each of the light source devices, the left side represents the y-axis (irregularity generated in the range of from blue to green), and the right side represents the x-axis (irregularity generated in the range of from blue to red). Though it is difficult to confirm by the monochromic diagrams in FIG. 14, the light source device without any lens produced heavier irregularities in chromaticity, as compared with the other light source devices 1 and 51.

FIGS. 15A to 15H show various modification examples of lens. The lenses shown in FIGS. 15E, 15F, 15G and 15H are lenses which have a diverging ability at the light incident surfaces thereof, i.e., lenses which have concave incident surfaces. The conditions of rise-up of the luminous flux from the light guide plate 2 differ depending on the thickness, shape or system of the light guide plate 2, and, therefore, the shape of lens is also required to be changed as shown in FIGS. 15A to 15H. Incidentally, the meanings of the symbols in the figures are as follows:
f: flat surface
c1: convex cylindrical surface
c2: concave cylindrical surface
t1: convex toroidal surface
t2: concave toroidal surface.

FIGS. 16A to 16E show various modification examples of the light guide plate. While the incidence plane 2a was a flat surface in the above-described embodiments, different cut patterns of the incidence plane are shown here. The incidence plane of the light guide plate shown in FIG. 16A has prism parts p; the incidence plane shown in FIG. 16B has convex prism parts p1; the incidence plane shown in FIG. 16C has convex prism parts p2; the incidence plane shown in FIG. 16D has convex cylindrical lens parts e1; and the incidence plane shown in FIG. 16E has concave cylindrical lens parts e2. In the case of a lens part composed of the convex cylindrical lens parts e1, light can be condensed in the light guide plate. In the case of the convex cylindrical lens parts e2, light can be diverged in the light guide plate. In addition, the cylindrical surface may be replaced by a toroidal surface or other aspheric surface.

In the respective incidence planes shown in FIGS. 16A to 16E, the pitch of the prisms or lenses may be fixed, varied, or set at random. Or, in the incidence planes shown in FIGS. 16A to 16E, the height (the height in the X axis direction) of the prisms or lenses may be fixed, varied, or set at random.

Figure 16A:
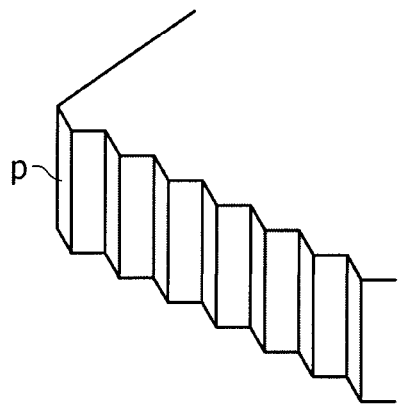
FIGS. 16A to 16E show various modification examples of the light guide plate, showing the examples which differ in the cut pattern of the incidence plane.
Figure 16D:
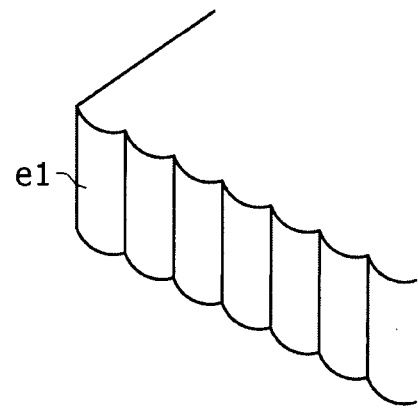
Figure 16B:
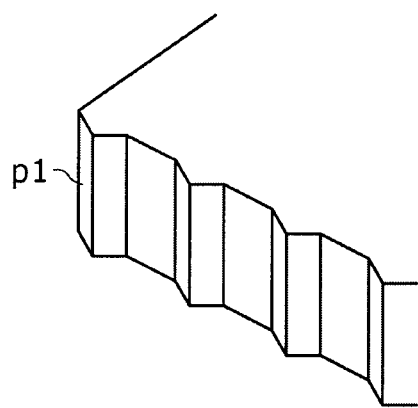
Figure 16E:
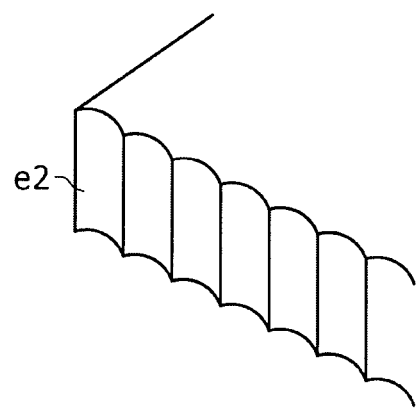
Figure 16C:
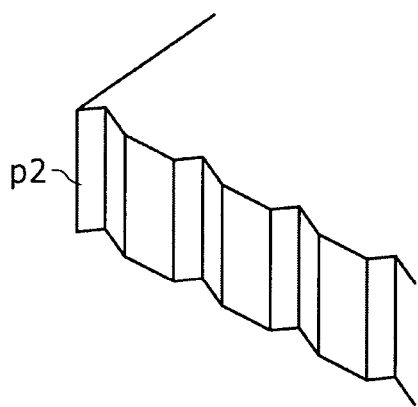
Figure 16C:
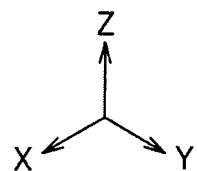

Besides, in the cases shown in FIGS. 16D and 16E, if the power at the lens part is insufficient, the incidence plane may be so formed as to have a curvature as viewed in the X-Z plane, though not shown. The shape of the curved surface in that case may be a cylindrical surface, a toroidal surface or other aspheric surface.

In the case of an incidence plane composed of a flat surface, if the refracting power at the incidence plane is insufficient, the use of any of the light guide plates shown in FIGS. 16A to 16E increases the refracting power, which is very effective.

Figure 17:
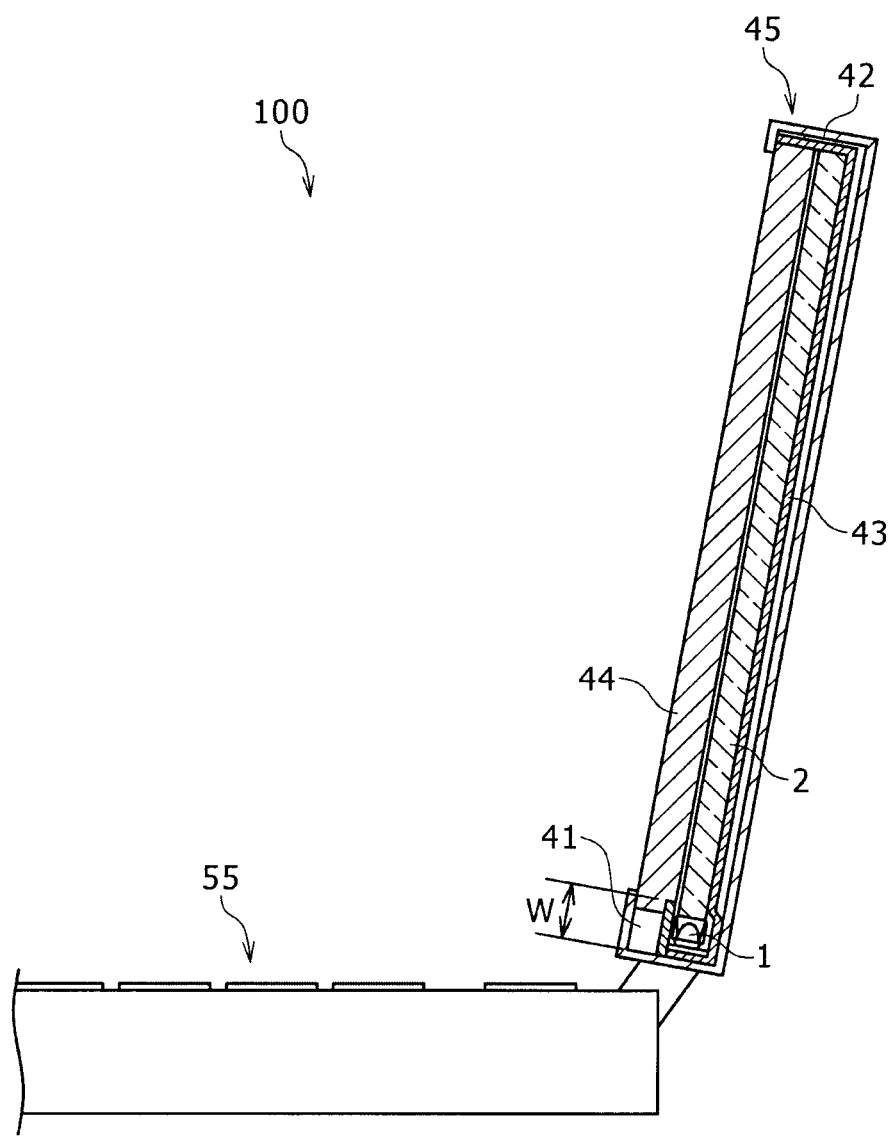
FIG. 17 is a partial sectional view showing a part of a laptop-type PC equipped with a display using the backlight device according to the above embodiment of the present invention.

FIG. 17 is a partial sectional view showing a part of a laptop type PC in which a display using the backlight device 10 according to the above-described embodiment is mounted. The PC 100 includes a main body 55, and a display 45. The display 45 has a liquid crystal panel 44, and the light source device 1 according to one of the above-described embodiments and the like are disposed at a lower edge part 41. The light source device 1 may be disposed also at an upper edge part 42 in addition to the lower edge part 41, or may be disposed only at the upper edge part 42. Or, the light source devices 1 may be disposed at left and right edge parts.

The scope of the present invention is not to be construed as limited to the above-described embodiments, and the invention can be carried out in other various embodiments.

For example, while the liquid crystal panel has been mentioned as an example of the element for modulating the transmittance of light, any micro element operated, for example, an electrostatic action, a piezoelectric action, a magnetic action or the like may be adopted as the element for modulating the transmittance of light.

The first reflective surface 17 or the second reflective surface 27 of the reflective member 7 may be a curves surface, instead of the flat surface. Examples of the shape of the curved surface include various shapes. In the reflective member 7, the second reflective surface 27 has been described to be provided at the base part 7a. However, the second reflective surface 27 may be formed at each side surface 36 of the lens 6. In that case, a film with a high light reflectance may be formed on the side surface 36 by vapor deposition, sputtering, coating, or the like method; alternatively, a reflective sheet (not shown) or the like may be adhered to the side surface 36.

In the above description, the reflective member 7 has had a structure including the base part 7a and the wedge part 7b. However, the reflective member 7 may be provided with the base part 7a and the wedge part 7b as separate members. In addition, in the above description, the reflective member 7 has had a structure in which the width of the wedge part 7b gradually decreases as one goes away from the base part 7a. However, the reflective member 7 may simply have a substantially constant thickness, instead of having the wedge-like shape.

As the backlight device 10 in the above-described embodiment, there may be adopted a backlight device which, for example, does not have the light guide plate 2 and in which the light going out from the lens 6 is released into air.

In the structure of the light guide plate 2, for example, the principal surfaces (the surfaces to which the optical sheets 3, 4 are applied) of the light guide plate 2 may be in a prism-like shape. Or, the thickness of the light guide plate 2 gradually increases as one goes away from the light source device 1, i.e., the light guide plate 2 may have a wedge-like shape. This makes it possible to further suppress irregularities in luminance and chromaticity.

While the PC 100 has been mentioned as an example of the electronic apparatus shown in FIG. 17, the present invention is applicable to TV and other various kinds of displays.

It should be understood by those skilled in the art that various modifications, combinations, sub-combinations and alterations may occur depending on design requirements and other factor in so far as they are within the scope of the appended claims or the equivalents thereof.

What is claimed is:

1. An electronic apparatus comprising:
   a light emitting element;
   a lens having an incident surface on which light emitted by the light emitting element is incident, and an outgoing surface configured to converge light and from which the light incident on the incident surface is transmitted;
   a light guide plate having a light incidence plane and introducing through the incidence plane the light transmitted from the outgoing surface, so as to perform surface light emission;
   a reflective member operative to reflect a portion of the light transmitted from the outgoing surface of the lens, toward the incidence plane of the light guide plate, wherein the reflective member comprises a first reflective portion provided so as to face a side surface of the lens and causing light having already been transmitted through the side surface to be repeatedly incident on the side surface and to be transmitted through the outgoing surface, and wherein the reflective member comprises a second reflective portion configured to reflect light having already been transmitted through the outgoing surface toward the incidence plane of the light guide plate, the first reflective portion including a base part having a constant thickness and the second reflective portion including a wedge part having a thickness that gradually decreases in a direction further from the base part and toward the light guide plate; and
   a transmittance modulating element having a plurality of pixels and operative to modulate the transmittance of the light emitted by the light guide plate on a pixel basis.

2. The electronic apparatus of claim 1, wherein the reflective member comprises a base part having an end edge portion that is disposed a distance furthest from the light guide plate relative to other portions of the reflective member.

3. The electronic apparatus of claim 2, wherein the end edge portion of the base part is closer to the light guide plate than the light emitting element is to the light guide plate and the incident surface includes a principal surface configured to converge light and a projected surface provided at an end portion of the principal surface and projected from the principal surface.

4. The electronic apparatus of claim 3, wherein light emitted by the light emitting element is incident on the projected surface prior to reflection by the base part of the reflective member.

5. The electronic apparatus of claim 1, wherein the first reflective portion comprises a base part having an end edge portion that is disposed a distance further from the light guide plate relative to second reflective portion, wherein the end edge portion of the base part is closer to the light guide plate than the light emitting element is to the light guide plate.

6. A light guide plate comprising:
   an incidence plane through which light emitted by a light emitting element is introduced;
   at least one of a lens and a prism provided at the incidence plane; and
   a reflective member operative to reflect a portion of light transmitted from an outgoing surface of the lens or prism toward the incidence plane of the light guide plate, wherein the reflective member comprises a first reflective portion provided so as to face a side surface of the lens or prism and causing light having already been transmitted through the side surface to be repeatedly incident on the side surface and to be transmitted through the outgoing surface, and wherein the reflective member comprises a second reflective portion configured to reflect light having already been transmitted through the outgoing surface toward the incidence plane of the light guide plate, the first reflective portion including a base cart having a constant thickness and the second reflective portion including a wedge part having a thickness that gradually decreases in a direction further from the base part and toward the light guide plate.

7. The combination of claim 6, wherein the base part has an end edge portion that is disposed a distance furthest from the light guide plate relative to other portions of the reflective member.

8. The combination of claim 7, wherein the end edge portion of the base part is closer to the light guide plate than the light emitting element is to the light guide plate and the incident surface includes a principal surface configured to converge light and a projected surface provided at an end portion of the principal surface and projected from the principal surface.

* * * * *